United States Patent
Ablavatski et al.

(10) Patent No.: US 11,158,122 B2
(45) Date of Patent: Oct. 26, 2021

(54) SURFACE GEOMETRY OBJECT MODEL TRAINING AND INFERENCE

(71) Applicant: Google LLC, Mountain View, CA (US)

(72) Inventors: Artsiom Ablavatski, Mountain View, CA (US); Yury Kartynnik, San Jose, CA (US); Ivan Grishchenko, San Jose, CA (US); Matthias Grundmann, San Jose, CA (US)

(73) Assignee: Google LLC, Mountain View, CA (US)

( * ) Notice: Subject to any disclaimer, the term of this patent is extended or adjusted under 35 U.S.C. 154(b) by 38 days.

(21) Appl. No.: 16/591,359

(22) Filed: Oct. 2, 2019

(65) Prior Publication Data

US 2021/0104096 A1     Apr. 8, 2021

(51) Int. Cl.
G06T 17/20     (2006.01)
G06N 3/08     (2006.01)
G06N 3/04     (2006.01)

(52) U.S. Cl.
CPC ............. G06T 17/205 (2013.01); G06N 3/08 (2013.01); G06N 3/04 (2013.01)

(58) Field of Classification Search
CPC combination set(s) only.
See application file for complete search history.

(56) References Cited

U.S. PATENT DOCUMENTS

| | | | |
|---|---|---|---|
| 2018/0357819 A1* | 12/2018 | Oprea | G06T 17/00 |
| 2019/0205620 A1* | 7/2019 | Yi | G06K 9/00268 |
| 2019/0295303 A1* | 9/2019 | Wrotek | G06T 13/20 |
| 2020/0265294 A1* | 8/2020 | Kim | G06T 13/00 |
| 2020/0380780 A1* | 12/2020 | Lysenkov | G06K 9/00208 |

OTHER PUBLICATIONS

Bazarevsky et al., "Blazeface: Sub-millisecond Neural Face Detection on Mobile GPUs", arXiv, Jul. 2019, 4 pages.
Blanz et al., "A morphable model for the synthesis of 3D faces", Proceedings of the 36th International Conference and Exibition on Computer Graphics and Interactive Techniques, 8 pages.
Bulat et al., "How far are we from solving the 2D and 3D face alignment problem? (and a dataset of 230,000 3D facial landmarks)", ICCV Paper, 2017, 10 pages.
Casiez et al., "1 Filter: A Simple Speed Based Low Pass Filter for Noisy Input in Interactive Systems", Proceedings of the SIGCHI Conference on Human Factors in Computing Systems, 2012, 4 pages.
Catmull et al., "Recursively generated B-spline surfaces on athitray topological meshes", Computer-Aided Design, 1978, 6 pages.
Gerig et al., "Morphable face models—an open frame work", arXiv, Sep. 2017, 8 pages.
Grossberg et al., "What is the space of camera response functions", IEEE Computer Society Conference on Computer Vision and Pattern Recognition, 2003, 8 pages.

* cited by examiner

Primary Examiner — Andrew G Yang
(74) Attorney, Agent, or Firm — Fish & Richardson P.C.

(57) ABSTRACT

Methods, systems, and apparatus, including computer programs encoded on a computer storage medium, for training a neural network model to predict mesh vertices corresponding to a three-dimensional surface geometry of an object depicted in an image.

13 Claims, 5 Drawing Sheets

SURFACE GEOMETRY OBJECT MODEL TRAINING AND INFERENCE

BACKGROUND

Recent developments in deep learning and annotated data sets have yielded much improved accuracy on computer vision tasks. For any particular object type, e.g., a face, a particular animal, a common technique involves predicting the object geometry by aligning an object mesh template. This is commonly posed in terms of locating relatively few landmarks. These landmarks either have distinct semantics of their own or are part of a meaningful object contour.

For some particular object types, such as a face, an alternative approach is to estimate the pose, scale, and the parameters of a 3D morphable model (3DMM). This kind of processing, however, is resource intensive and is sensitive to deviations of an expected object contour, e.g., a face with one eye closed.

SUMMARY

This specification relates to geometric computer modelling using mesh vertices that represent the surface geometry of an object. In particular, the subject matter of this application relates to methods and systems for training a neural network model to predict mesh vertices that represents the surface geometry of objects depicted in an image.

In general, one innovative aspect of the subject matter described in this specification can be embodied in methods that include the actions of training a neural network model to predict mesh vertices corresponding to a three-dimensional surface geometry of an object of a particular type depicted in an image: detecting, within the training image, an object of the particular type; determining a set of mesh vertices that define the object depicted in the training image; determining a set of landmarks that each correspond to a proper subset of the mesh vertices; initially training the neural network model to generate a prediction of mesh vertices corresponding to a three-dimensional surface geometry of an object of the particular type depicted in an image, the training based on the training images, the sets of mesh vertices, and the sets of landmarks; iteratively training the neural network model after the initial training step, and for each iteration: selecting a subset of the training images based on a performance evaluation of the neural network model for the training images; for each image in the selected subset of training images, adjusting the set of mesh vertices for the image; and training the neural network model to generate the prediction of mesh vertices corresponding to the three-dimensional surface geometry of an object of the particular type depicted in an image, the training based on the subset of training images, the sets of landmarks, and the adjusted mesh vertices. Other embodiments of this aspect include corresponding systems, apparatus, and computer programs, configured to perform the actions of the methods, encoded on computer storage devices.

In some implementations, determining a set of mesh vertices comprise determining a set of two-dimensional mesh that corresponds to a three-dimensional surface geometry of the object of the particular type. In some implementations, determining the set of two-dimensional mesh vertices that corresponds to the three-dimensional surface geometry of the object of the particular type includes determining a three-dimensional mesh vertices that define the surface geometry, and determining a planar projection of the three-dimensional mesh vertices to generate the set of two-dimensional mesh vertices.

In some implementations, the method may further comprise determining the set of landmarks that each correspond to a proper subset of the mesh vertices, and for each landmark: identifying a portion of the image depicting a pre-defined structure that corresponds to the landmark; and determining the set of two-dimensional mesh points that correspond to the portion of the image depicting a pre-defined structure; and associating the set of two-dimensional mesh points that correspond to the portion of the image depicting a pre-defined structure with the landmark.

In some implementations, adjusting the set of mesh vertices for the image includes receiving adjustments of landmarks by human annotators, and based on the adjustments of landmarks, updating the mesh vertices that correspond to each adjusted landmark.

Particular embodiments of the subject matter described in this specification can be implemented so as to realize one or more of the following advantages. The trained model is a lightweight model that can be readily deployed on mobile devices and still yield a fast inference response time. In some implementations, the input to the model is a frame (or, more generally, a stream of frames) of a single RGB camera, and no depth sensor information is required when predicting the surface geometry. The number of vertices predicted by the lightweight model is still sufficient to accommodate potential expressivity or object deformations, e.g., a human face with an eye close will still result in an accurate prediction.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes an end-to-end neural network model for inferring an approximate three-dimensional (3D) mesh representation of an object. Throughout this specification, the particular object type is a human face. However, the methods described below may also be used for other object types. The mesh density used has a number of vertices that is selected to be well suited for augmented reality effects, but still relatively small enough to facilitate near real-time inferences using only lightweight processing devices, such as a mobile device.

Image Processing Using the 3D Mesh Prediction Model

Figure 1A:
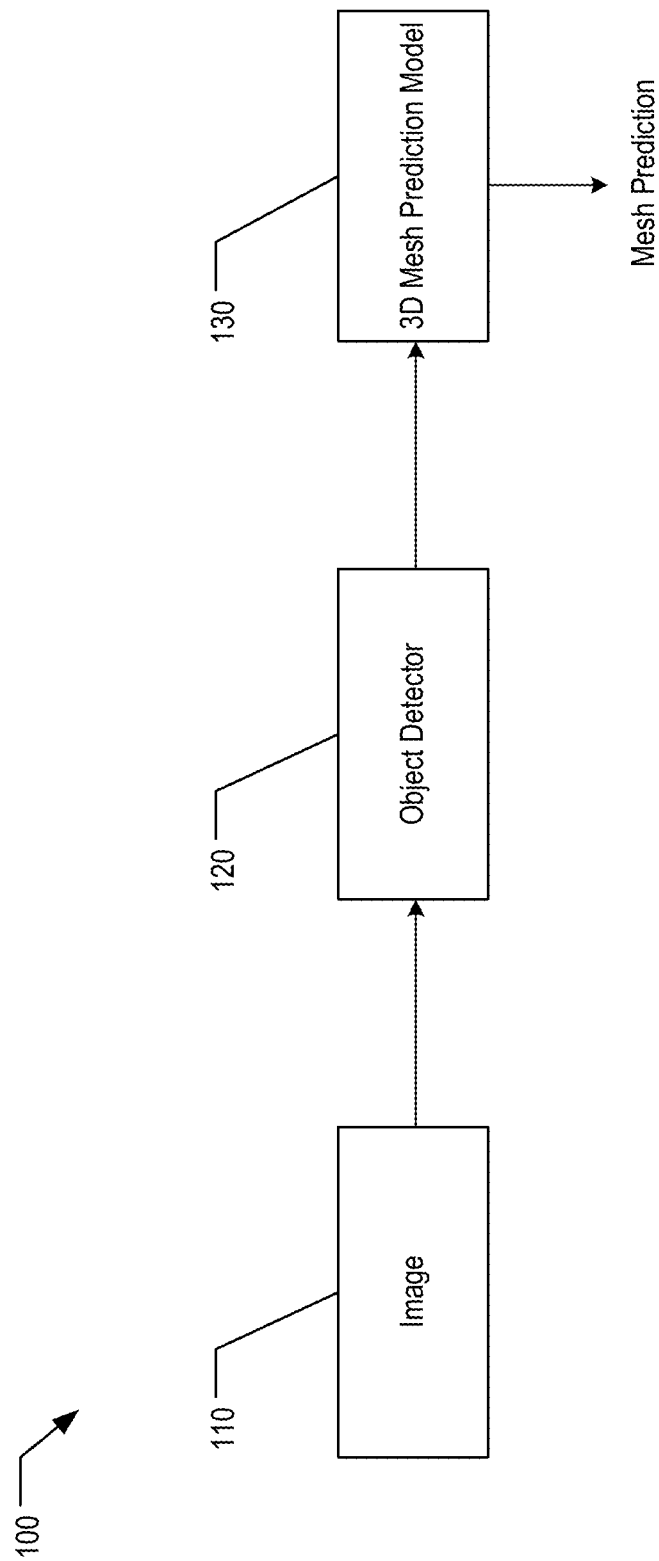
FIG. 1A is a system flow diagram of an example system that employs a 3D mesh prediction model.
Figure 1B:
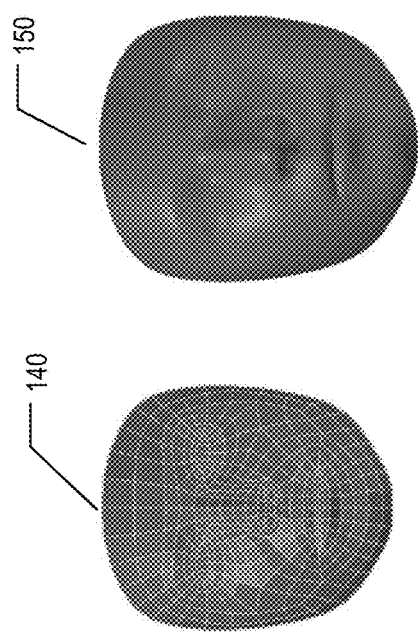
FIG. 1B is an illustration of a predicted object mesh for a human face.

The model, once trained, is used in conjunction with an object detector. FIG. 1A is a system flow diagram of an example system that employs a 3D mesh prediction model, and FIG. 1B is an illustration of a predicted object mesh 140 for a human face. In operation, the image 110 (such as a frame from a camera) is processed by a lightweight object detector that produces an object bounding rectangles and several landmarks. In the context of a face object, for example, the landmarks may include eye centers, ear tragions, and a nose tip. The landmarks are used to rotate an object rectangle to align a reference line with the rectangle. For example, for a face, a line connecting the eye centers is aligned with the horizontal axis of the rectangle.

The rectangle obtained is cropped from the original image and resized to form the input to the mesh prediction model. The crop size may vary, depending on the size of the mesh prediction model. For example, for a large model, the size may be 256×256 pixels, and for a more compact model, the size may be 128×128 pixels. This 3D mesh prediction model produces a vector of 3D landmark coordinates, which is then mapped back into the original image coordinate system, resulting in a mesh overlay on the detected object.

In some implementations, the x- and y-coordinates of the vertices correspond to the point locations in the 2D plane as given by the image pixel coordinates. The z-coordinates are interpreted as the depth relative to a reference plane passing through the mesh's center of mass. They are re-scaled so that a fixed aspect ratio is maintained between the span of x-coordinates and the span of z-coordinates, i.e., and object that is scaled to half its size has its depth range (nearest to farthest) scaled down by the same multiplier.

In some implementations, when used on video input in the object-tracking mode, an object crop is available from the previous frame prediction and the usage of the object detector is redundant.

In some implementations, for the mesh prediction model, a residual neural network architecture is used. More aggressive subsampling is used in the early layers of the network and most of the computation is dedicated to its shallow part. Thus, the neurons' receptive fields start covering large areas of the input image relatively early. When such a receptive field reaches the image boundary, its relative location in the input image becomes implicitly available for the model to rely on (due to convolution padding). Consequently, the neurons for the deeper layers are likely to differentiate between object features, e.g. mouth-relevant and eye-relevant features in the use case of a face object.

In some implementations, the 3D mesh prediction model operates on a single-frame level, and the only information that is passed between frames is the rotated object bounding rectangle, and, optionally, whether or not it should be re-evaluated with the object detector. Because of the inconsistencies in pixel-level image representations of object across subsequent video frames (due to small affine transforms of the view, reference change, lighting variation, as well as different kinds of camera sensor noise), this leads to human-noticeable fluctuations, or temporal jitter, in the trajectories of individual landmarks. To address this issue, in some implementations, a one-dimensional temporal filter is applied independently to each predicted landmark coordinate. In some implementations, a one Euro filter is used. Other filters may also be used; the main premise of the one Euro filter and related filters is that in the trade-off between noise reduction and phase lag elimination, the former is preferred (resulting in stabilization) when the parameters are virtually not changing and the latter is preferred (resulting in avoiding the lag) when the rate of change is high. In some implementations, the filter maintains a fixed rolling window of a few timestamped samples for velocity estimations, which are adjusted by the object to accommodate for object scale changes in a video stream. Using this filter leads to acceptable prediction sequences on videos without visible jitter.

As illustrated in FIG. 1B, one example mesh representation 140 includes 468 vertices arranged in fixed quads. Of course, other mesh sizes can also be used. The mesh representation 140 enables the building a plausible smooth surface representation 130 of the human face using algorithmic or machine leaning techniques. For example, Catmull-Clark subdivision can be used, resulting in the representation 150. In some implementations, the mesh representation 120 can include a different number of vertices, where the number of vertices is based in parts on the intended application. For example, AR effects, virtual accessory, apparel try-on or makeup may require fewer or more vertices.

Training the 3D Mesh Prediction Model

To train the 3D mesh prediction model, a dataset of images in which an object of interest is depicted in used. In some implementations, a globally sourced dataset of mobile camera photos taken from a wide variety of sensors in changing lighting conditions. During training, the dataset may be further augmented with standard cropping and image processing primitives, and others, such as modelling camera sensor noise and applying a randomized non-linear parametric transformation to the image intensity histogram. Other augmentations may also be used.

Obtaining the ground truth for a set of 3D mesh vertices can be a labor-intensive and highly ambiguous task. Thus, instead of a completely manual annotation process, a bootstrapping process may be employed. First, an initial model is trained using two sources of supervision. The first source is synthetic renderings of a 3D morphable model (3DMM) over the object rectangles of photos. In some implementations, real-world photos are used as opposed to photos with solid backgrounds to avoid overfitting. The ground truth vertex coordinates are thus immediately available from a predefined correspondence between the N mesh points and a subset of 3DMM vertices.

Two-dimensional landmarks corresponding to a subset of the mesh vertices participating in a set of semantic contours are annotated over the actual dataset. The landmarks are predicted as a separate output at the end of a dedicated network branch, introduced with the intent to share the intermediate face representations between the 2D and 3D paths. Each landmark corresponds to a shape or structure that defines the visually identifiable characteristics of the object. For example, the human face comprises the eyes, nose, lips and ears as landmarks. In some implementations these landmarks may also represent other visually identifiable features like distance between landmarks, color etc. For example, in a human face the distance between the eyes, eyebrows or lip corners. These landmarks are represented using one or a plurality of vertices that form a subset of the set of vertices that comprise the mesh representation of the object.

Figure 2A:
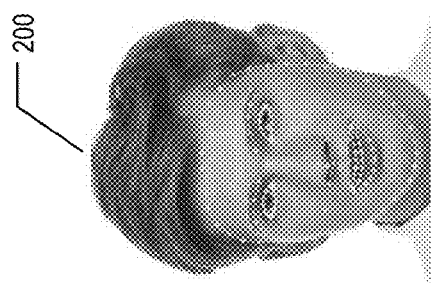
FIG. 2A is an illustration of two-dimensional semantic contours used during a training process.

For example, when the 3D mesh prediction model is used for facial object, the set of annotated two-dimensional landmarks corresponding to the subset of the mesh vertices are as illustrated in FIG. 2A. More or fewer landmarks can be used.

Figure 2B:
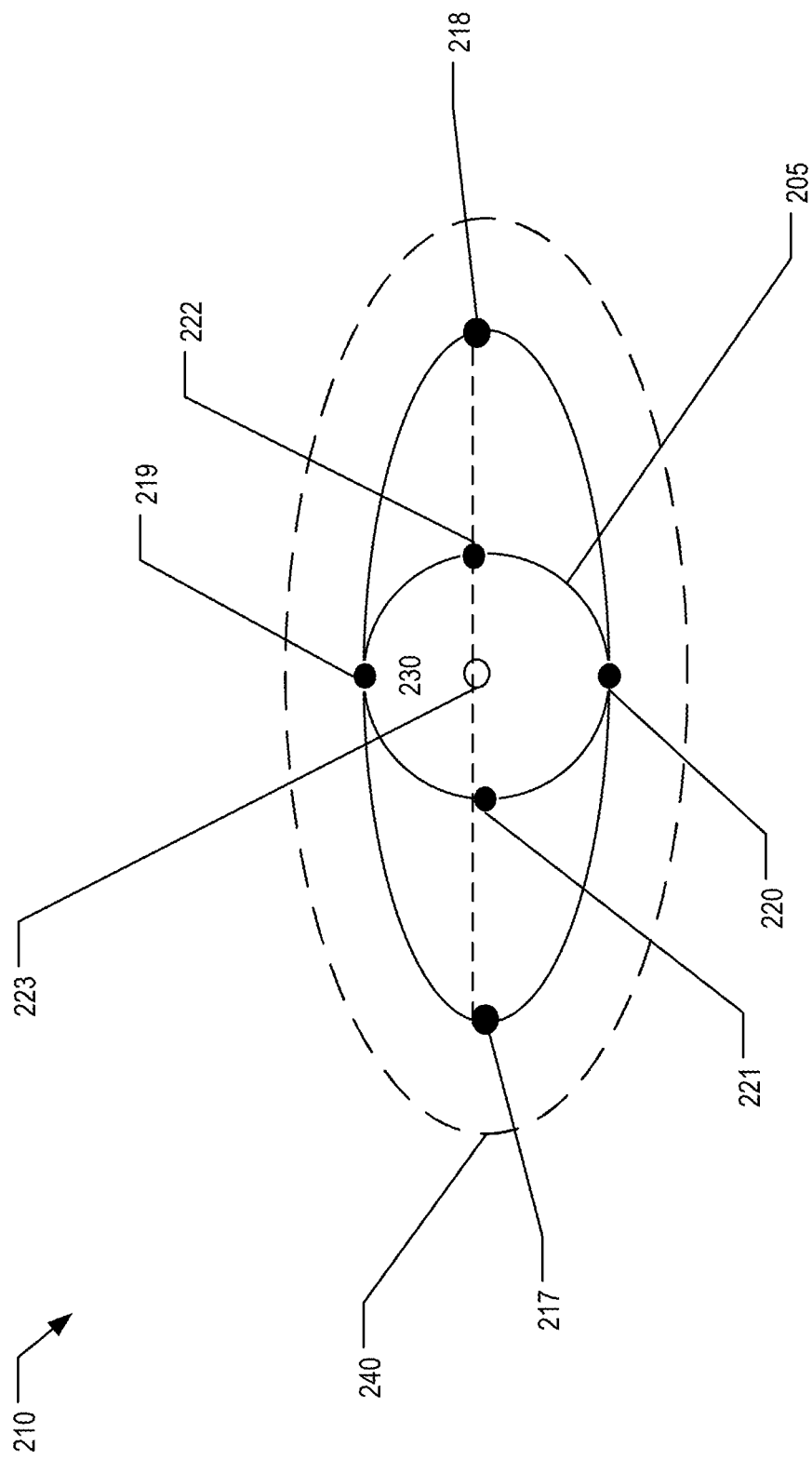
FIG. 2B is an example of a landmark and its representation using mesh vertices.

An example set of vertices for a human eye landmark is shown in FIG. 2B. The human eye 200 is enclosed in the dotted boundary 240. The human eye 200 is a landmark since it is one of the visually identifiable features of the human face 110. The human eye 200 is represented using six vertices 217, 218, 219, 220, 221 and 222. In other implementations, the human eye can be represented using any other number of vertices. The six vertices 217-222 form a subset of the N mesh vertices predicted by the 3D mesh prediction network.

After this first model has been trained, a subset of the images in the dataset will have predictions suitable for refinement in the subsequent step. The training process then iteratively refines the x- and y-coordinates bootstrapped by applying the most up-to-date model to the images, filtering out those suitable for such refinement. In some implementations, human annotators may determine when an image is suitable for refinement. In other implementations, an image is determined to be suitable for refinement when a prediction error is determined to be less than a maximum error threshold.

In some implementations, annotation refinement is enabled by a "brush" instrument with adjustable radius that lets a whole range of points to be moved at once. The amount of movement of each vertex exponentially decreases with the distance along the mesh edges from the pivot vertex under the mouse cursor. This allows annotators to adjust substantial area displacements with large "strokes" before local refinements, while preserving the mesh surface smoothness. The z-coordinates are left intact; the only source of supervision for the z-coordinates is the synthetic 3D rendering described above. Despite the depth predictions being thus not metrically accurate, the resulting meshes are accurate enough to provide suitable 3D texture renderings over the object and to align additional 3D objects as part of an augmentation process.

Figure 3:
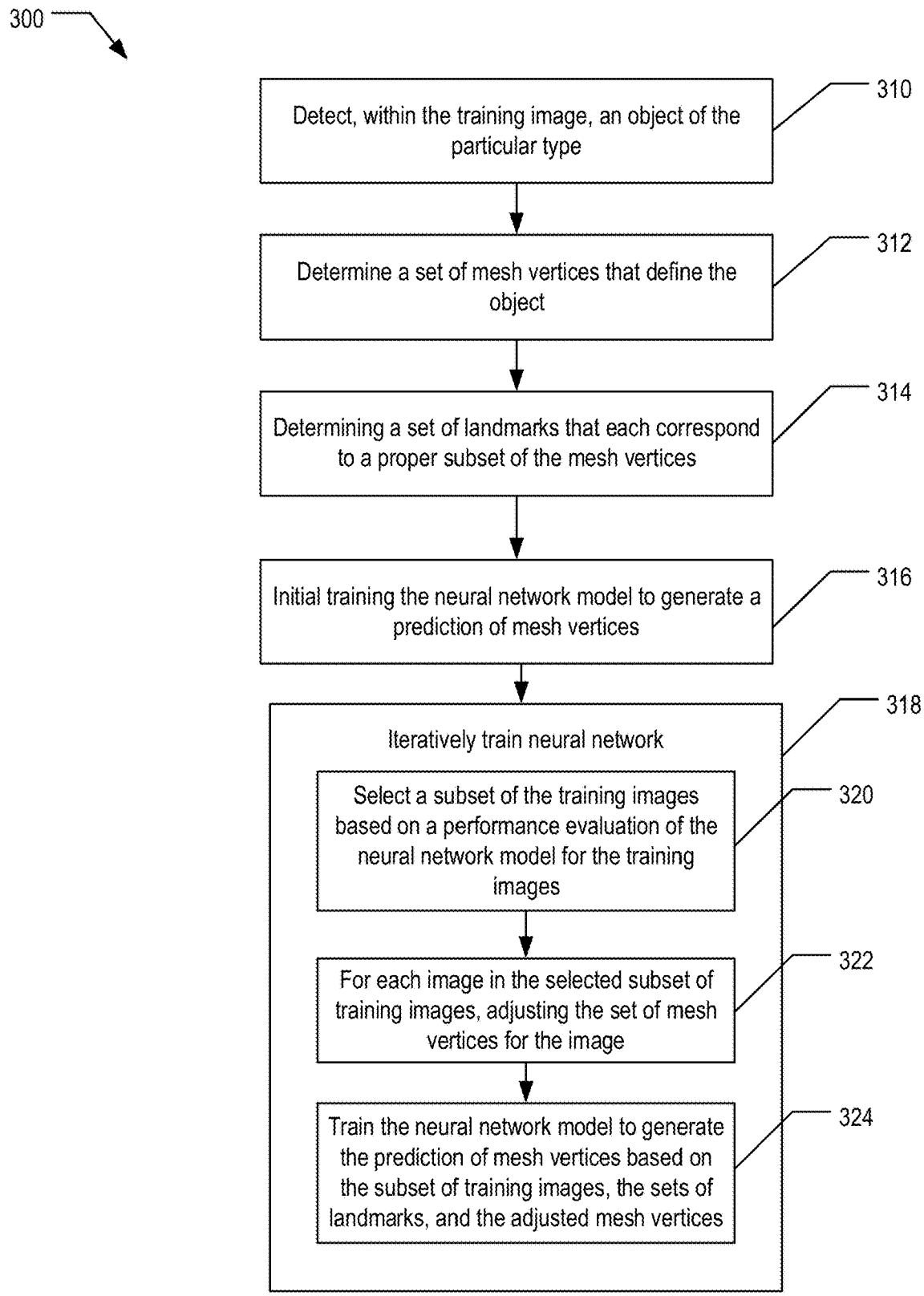
FIG. 3 is a flow diagram of an example training process of the three-dimensional mesh prediction model.
Figure 4:
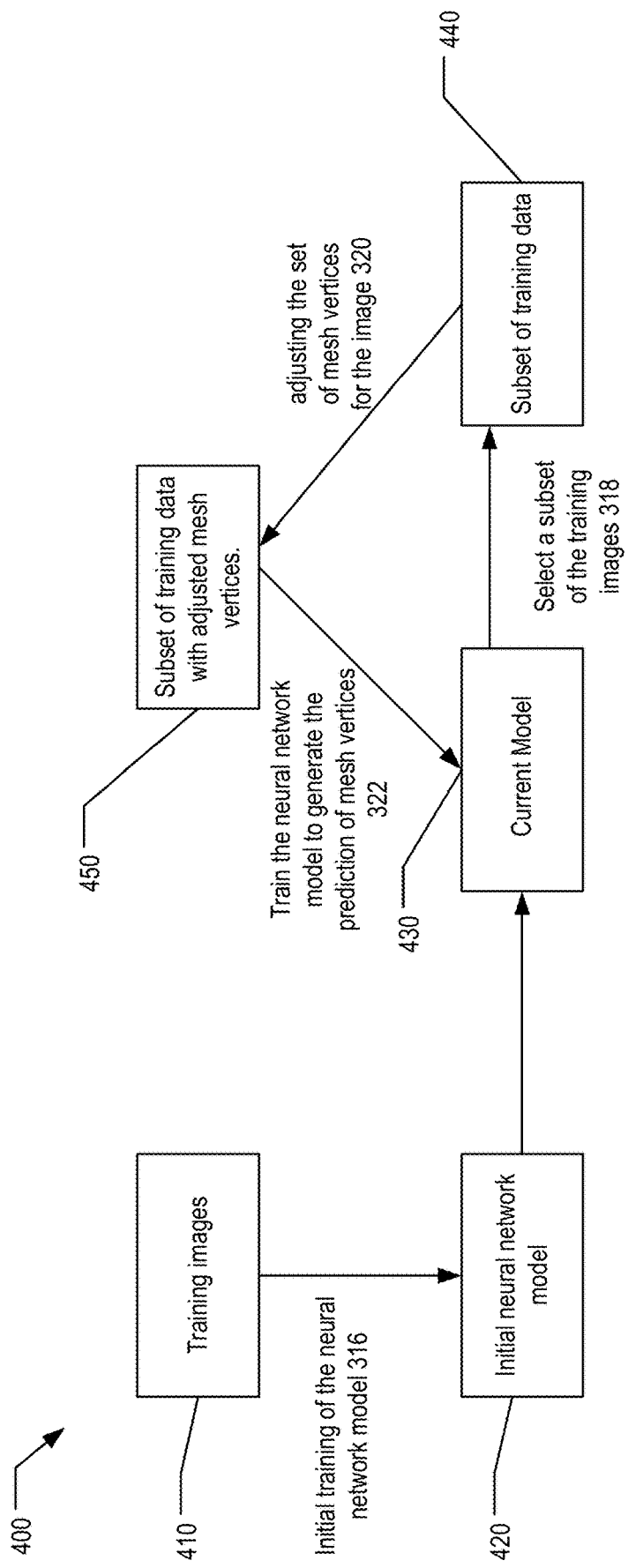
FIG. 4 is a system flow diagram of an example iterative training process of the neural network model.

FIG. 3 is a flow diagram of an example training process 300 of the 3D mesh prediction model, and FIG. 4 is a block diagram 400 of an example iterative training process of the neural network model. The process 300 is implemented in a computer system that includes one or more computers, and is described with reference to FIG. 4. The process 300 trains the neural network model to predict mesh vertices corresponding to a three-dimensional surface geometry of an object of a particular type depicted in images.

For each image in a set of training images 410, the process 300 detects, within the training image, an object of the particular type (310). For example, in the context of a face object, a face is detected. The image may be cropped and the cropped portion resized.

For each image in the set of training images, the process 300 determines a set of mesh vertices that define the object (312). For example, for a face object, a set of N mesh vertices that define the object depicted in the training image is determined. In some implementations, the set of mesh vertices that are determined are a set of two-dimensional mesh that corresponds to a three-dimensional surface geometry of the object of the particular type. This can be done, for example, by determining three-dimensional mesh vertices that define the surface geometry, and then determining a planar projection of the three-dimensional mesh vertices to generate the set of two-dimensional mesh vertices.

For each image in the set of training images, the process 300 determines a set of landmarks that each correspond to a proper subset of the mesh vertices (314). For example, in the context of a face object, landmarks corresponding to the eyes, nose, lips, and ears may be determined. In some implementations, to determine a landmark, the process identifies a portion of the image depicting a pre-defined structure that corresponds to the landmark, and then determines the set of two-dimensional mesh points that correspond to the portion of the image depicting a pre-defined structure. The set of two-dimensional mesh points that correspond to the portion of the image depicting a pre-defined structure are then associated with the landmark.

The process 300, at step 316, then initially trains the neural network model to generate an initial neural network model 420. The initial neural network model 420 predicts mesh vertices corresponding to a three-dimensional surface geometry of an object of the particular type depicted in an image. The training is based on the training images, the sets of mesh vertices, and the sets of landmarks as described above.

The process 300 then iteratively trains the neural network model after the initial training step (318). The initially trained model 420 becomes the current model 430 of FIG. 4.

For each iteration, a subset of the training images 440 is selected based on a performance evaluation of the neural network model for the training images is selected (320). For example, images determined to be suitable for refinement, as described above, may be selected.

For each image in the selected subset of training images 440, the set of mesh vertices for the image are adjusted (322). In some implementations, augmentations may also be generated. The adjustments may be made by human annotators, or by a pre-trained machine learning process. In implementations that receive human annotator inputs, the process 300 receives adjustments of landmarks by human annotators, and based on the adjustments of landmarks, updates the mesh vertices that correspond to each adjusted landmark. State 322 thus generates a set of training data 450 with adjusted mesh vertices. Such data may also be referred to as annotated data.

The process 300 then trains the neural network model to generate the prediction of mesh vertices based on the subset of training images, the sets of landmarks, and the adjusted mesh vertices (324). The predicted mesh vertices correspond to the three-dimensional surface geometry of an object of the particular type depicted in an image.

The stages 320, 322 and 324 continue for subsequent iterations until the desired accuracy for predicting the coordinates of vertices of the mesh representation is reached. The model may then be persisted and distributed for use.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   for each of a plurality of training images for training a neural network model to predict mesh vertices corresponding to a three-dimensional surface geometry of an object of a particular type depicted in an image:
     detecting, within the training image, an object of the particular type, wherein the object is a human face;
     determining a set of mesh vertices that define the object depicted in the training image;
     determining a set of landmarks that each correspond to a proper subset of the mesh vertices, wherein each landmark is a predefined facial feature;
     for each of the images:
       determining a reference line that connects at least two landmarks detected in the image;
       rotating an object rectangle to align the reference line with a horizontal axis of the rectangle; and
       cropping the image to include the only the portion of the image within the object rectangle to obtained a cropped image;
   initially training the neural network model to generate a prediction of mesh vertices corresponding to a three-dimensional surface geometry of an object of the particular type depicted in an image, the training based on the training images as cropped, the sets of mesh vertices, and the sets of landmarks;
   iteratively training the neural network model after the initial training step, and for each iteration:
     selecting a subset of the training images as cropped based on a performance evaluation of the neural network model for the training images;
     for each image in the selected subset of training images as cropped, adjusting the set of mesh vertices for the image; and
     training the neural network model to generate the prediction of mesh vertices corresponding to the three-dimensional surface geometry of an object of the particular type depicted in an image, the training based on the subset of training images as cropped, the sets of landmarks, and the adjusted mesh vertices.

2. The method of claim 1, wherein determining a set of mesh vertices comprises determining a set of two-dimensional mesh vertices that corresponds to a three-dimensional surface geometry of the object of the particular type.

3. The method of claim 2, wherein determining the set of two-dimensional mesh vertices that corresponds to the three-dimensional surface geometry of the object of the particular type comprises:
   determining three-dimensional mesh vertices that define the surface geometry; and
   determining a planar projection of the three-dimensional mesh vertices to generate the set of two-dimensional mesh vertices.

4. The method of claim 1, wherein determining the set of landmarks that each correspond to a proper subset of the mesh vertices comprises, for each landmark:
   identifying a portion of the image depicting a pre-defined structure that corresponds to the landmark; and
   determining the set of two-dimensional mesh vertices that correspond to the portion of the image depicting a pre-defined structure; and
   associating the set of two-dimensional mesh vertices that correspond to the portion of the image depicting a pre-defined structure with the landmark.

5. The method of claim 1, wherein for each image in the selected subset of training images, adjusting the set of mesh vertices for the image comprises:
   receiving adjustments of landmarks by human annotators; and
   based on the adjustments of landmarks, updating the mesh vertices that correspond to each adjusted landmark.

6. The method of claim 1, wherein for each image in the selected subset of training images, adjusting the set of mesh vertices for the image comprises:
   receiving adjustments of mesh vertices by human annotators; and
   based on the adjustments, updating the mesh vertices.

7. A system, comprising:
   a data processing apparatus including one or more computers; and
   a non-transitory computer readable storage medium storing instructions that upon execution by the data processing apparatus cause the data processing apparatus to perform operations comprising:
   for each of a plurality of training images for training a neural network model to predict mesh vertices corresponding to a three-dimensional surface geometry of an object of a particular type depicted in an image:
     detecting, within the training image, an object of the particular type, wherein the object is a human face;
     determining a set of mesh vertices that define the object depicted in the training image;
     determining a set of landmarks that each correspond to a proper subset of the mesh vertices, wherein each landmark is a predefined facial feature;
     for each of the images:
       determining a reference line that connects at least two landmarks detected in the image;
       rotating an object rectangle to align the reference line with a horizontal axis of the rectangle; and
       cropping the image to include the only the portion of the image within the object rectangle to obtained a cropped image;
   initially training the neural network model to generate a prediction of mesh vertices corresponding to a three-dimensional surface geometry of an object of the particular type depicted in an image, the training based on the training images as cropped, the sets of mesh vertices, and the sets of landmarks;

iteratively training the neural network model after the initial training step, and for each iteration:

selecting a subset of the training images as cropped based on a performance evaluation of the neural network model for the training images;

for each image in the selected subset of training images as cropped, adjusting the set of mesh vertices for the image; and training the neural network model to generate the prediction of mesh vertices corresponding to the three-dimensional surface geometry of an object of the particular type depicted in an image, the training based on the subset of training images as cropped, the sets of landmarks, and the adjusted mesh vertices.

8. The system of claim 7, wherein determining a set of mesh vertices comprises determining a set of two-dimensional mesh vertices that corresponds to a three-dimensional surface geometry of the object of the particular type.

9. The system of claim 8, wherein determining the set of two-dimensional mesh vertices that corresponds to the three-dimensional surface geometry of the object of the particular type comprises:

determining three-dimensional mesh vertices that define the surface geometry; and determining a planar projection of the three-dimensional mesh vertices to generate the set of two-dimensional mesh vertices.

10. The system of claim 7, wherein determining the set of landmarks that each correspond to a proper subset of the mesh vertices comprises, for each landmark:

identifying a portion of the image depicting a pre-defined structure that corresponds to the landmark; and determining the set of two-dimensional mesh vertices that correspond to the portion of the image depicting a pre-defined structure; and associating the set of two-dimensional mesh vertices that correspond to the portion of the image depicting a pre-defined structure with the landmark.

11. The system of claim 7, wherein for each image in the selected subset of training images, adjusting the set of mesh vertices for the image comprises:

receiving adjustments of landmarks by human annotators; and based on the adjustments of landmarks, updating the mesh vertices that correspond to each adjusted landmark.

12. The system of claim 7, wherein for each image in the selected subset of training images, adjusting the set of mesh vertices for the image comprises:

receiving adjustments of mesh vertices by human annotators; and based on the adjustments, updating the mesh vertices.

13. A non-transitory computer readable storage medium storing instructions that upon execution by a data processing apparatus cause the data processing apparatus to perform operations comprising:

for each of a plurality of training images for training a neural network model to predict mesh vertices corresponding to a three-dimensional surface geometry of an object of a particular type depicted in an image:

detecting, within the training image, an object of the particular type, wherein the object is a human face;

determining a set of mesh vertices that define the object depicted in the training image;

determining a set of landmarks that each correspond to a proper subset of the mesh vertices, wherein each landmark is a predefined facial feature;

for each of the images:

determining a reference line that connects at least two landmarks detected in the image;

rotating an object rectangle to align the reference line with a horizontal axis of the rectangle; and cropping the image to include the only the portion of the image within the object rectangle to obtained a cropped image;

initially training the neural network model to generate a prediction of mesh vertices corresponding to a three-dimensional surface geometry of an object of the particular type depicted in an image, the training based on the training images as cropped, the sets of mesh vertices, and the sets of landmarks;

iteratively training the neural network model after the initial training step, and for each iteration:

selecting a subset of the training images as cropped based on a performance evaluation of the neural network model for the training images;

for each image in the selected subset of training images as cropped, adjusting the set of mesh vertices for the image; and training the neural network model to generate the prediction of mesh vertices corresponding to the three-dimensional surface geometry of an object of the particular type depicted in an image, the training based on the subset of training images as cropped, the sets of landmarks, and the adjusted mesh vertices.

* * * * *